United States Patent
Saito et al.

(10) Patent No.: US 8,734,067 B2
(45) Date of Patent: May 27, 2014

(54) DRILL

(75) Inventors: Manabu Saito, Tokyo (JP); Tatsuo Nakahata, Tokyo (JP); Hideharu Takahashi, Tokyo (JP); Junji Tsuchiya, Tokyo (JP); Eiji Hashimoto, Chiba (JP); Hirofumi Higashiwaki, Mie (JP)

(73) Assignees: Fuji Jukogyo Kabushiki Kaisha, Tokyo (JP); Makotoloy Co., Ltd., Osaka (JP)

( * ) Notice: Subject to any disclaimer, the term of this patent is extended or adjusted under 35 U.S.C. 154(b) by 969 days.

(21) Appl. No.: 12/720,314

(22) Filed: Mar. 9, 2010

(65) Prior Publication Data

US 2010/0232899 A1    Sep. 16, 2010

(30) Foreign Application Priority Data

Mar. 13, 2009   (JP) ................................. 2009-061009

(51) Int. Cl.
   *B23B 51/02*   (2006.01)
(52) U.S. Cl.
   USPC .......................................... 408/224; 408/229
(58) Field of Classification Search
   USPC ........................ 408/224, 227, 230, 223, 229
   IPC ...................................................... B23B 51/02
   See application file for complete search history.

(56) References Cited

U.S. PATENT DOCUMENTS

| | | | |
|---|---|---|---|
| 1,309,706 A * | 7/1919 | Taylor | 408/230 |
| 1,320,985 A * | 11/1919 | Brightman | 408/230 |
| 2,084,737 A | 6/1937 | Magnus | |
| 2,258,674 A * | 10/1941 | Ceska | 408/230 |
| 3,443,459 A * | 5/1969 | Mackey, Jr. et al. | 408/230 |
| 4,132,493 A * | 1/1979 | Hosoi | 407/53 |
| 4,411,563 A * | 10/1983 | Moon | 407/54 |
| 4,440,532 A | 4/1984 | D'Apuzzo | |
| 4,662,803 A * | 5/1987 | Arnold | 408/224 |
| 4,725,171 A | 2/1988 | DeTorre | |

(Continued)

FOREIGN PATENT DOCUMENTS

| | | |
|---|---|---|
| DE | 299 19 858 U1 | 4/2000 |
| DE | 202 09 767 U1 | 11/2003 |

(Continued)

OTHER PUBLICATIONS

Extended European Search Report for EP 10 15 5199 dated Jun. 17, 2010.

(Continued)

*Primary Examiner* — Eric A Gates
(74) *Attorney, Agent, or Firm* — Smith, Gambrell & Russell, LLP

(57) ABSTRACT

A drill includes a pair of main cutting edges extending from a distal portion of the drill to a position close to a proximal end of the drill to entirely define a two-edge configuration, and a pair of auxiliary cutting edges extending between positions at the distal and proximal sides of a maximum diameter position to partly define a four-edge configuration. A ridgeline of each auxiliary cutting edge is located within an angle smaller than 90° from a ridgeline of the corresponding main cutting edge toward the rear in a rotation direction of the drill. The point angle of the auxiliary cutting edges increases at a higher rate than the point angle of the main cutting edges in a predetermined range from the maximum diameter position toward a distal end of the drill.

4 Claims, 3 Drawing Sheets

(56) References Cited

U.S. PATENT DOCUMENTS

| | | | |
|---|---|---|---|
| 4,932,815 A | 6/1990 | Krauss | |
| 4,936,721 A * | 6/1990 | Meyer | 408/224 |
| 5,141,369 A | 8/1992 | Palace | |
| 5,217,332 A | 6/1993 | Takasaki et al. | |
| 5,282,705 A * | 2/1994 | Shiga et al. | 408/211 |
| 5,486,075 A * | 1/1996 | Nakamura et al. | 408/230 |
| 5,558,475 A | 9/1996 | Hakansson et al. | |
| 5,636,948 A | 6/1997 | Rexius | |
| 5,725,338 A | 3/1998 | Cabaret et al. | |
| 6,916,139 B2 * | 7/2005 | Yanagida et al. | 408/230 |
| 6,929,434 B2 * | 8/2005 | Prokop | 408/230 |
| 7,665,935 B1 * | 2/2010 | Garrick et al. | 408/227 |
| 7,717,710 B2 * | 5/2010 | Danger et al. | 433/165 |
| 8,132,989 B2 * | 3/2012 | Iguchi et al. | 408/230 |
| 2003/0129031 A1 * | 7/2003 | Mast et al. | 408/144 |
| 2005/0135889 A1 | 6/2005 | Turrini et al. | |
| 2008/0193234 A1 * | 8/2008 | Davancens et al. | 408/1 R |
| 2010/0158626 A1 * | 6/2010 | Nakahata et al. | 408/230 |
| 2010/0166517 A1 | 7/2010 | Saito et al. | |
| 2011/0200403 A1 * | 8/2011 | Gruber | 408/1 R |

FOREIGN PATENT DOCUMENTS

| | | | |
|---|---|---|---|
| DE | 103 46 217 A1 | 4/2005 | |
| JP | S57-127608 | 8/1982 | |
| JP | 63-306812 | 12/1988 | |
| JP | 2-237708 | 9/1990 | |
| JP | 5-245711 | 9/1993 | |
| JP | 6-75612 | 10/1994 | |
| JP | 6-75612 U | 10/1994 | |
| JP | 11114712 A * | 4/1999 | B23B 51/00 |
| JP | 2602032 Y2 | 12/1999 | |
| JP | 2002-036018 A | 2/2002 | |
| JP | 2007144526 A * | 6/2007 | |
| JP | 2008-036759 | 2/2008 | |
| JP | 2009039811 A * | 2/2009 | |
| SU | 1085702 | 4/1984 | |
| WO | WO 9731741 A1 * | 9/1997 | B23B 51/02 |
| WO | WO 2005030418 A1 * | 4/2005 | B23B 51/02 |

OTHER PUBLICATIONS

European Search Report dated Feb. 15, 2011 for Application No. EP 10 19 2825.

European Search Report dated Mar. 2, 2010 for Application No. EP 09 18 0077.

European Examination Report dated Jul. 11, 2013 for EP Application No. 10 155 199.2.

Chinese Office Action dated Jul. 3, 2013 for CN Application No. 201010130429.4.

* cited by examiner

DRILL

CROSS-REFERENCES TO RELATED APPLICATIONS

The present application claims priority from Japanese Patent Application No. 2009-061009 filed on Mar. 13, 2009, and is hereby incorporated by reference in its entirety.

BACKGROUND OF THE INVENTION

1. Field of the Invention

The present invention relates to a drill that partly has four cutting edges.

2. Description of the Related Art

A drill is generally used as a boring tool. A two-edge drill is frequently used (for example, see Japanese Unexamined Patent Application Publication No. 2008-36759). The two-edge drill has a relatively small number of cutting edges, and hence the two-edge drill can have large grooves. Thus, machining dust is efficiently discharged. As long as the machining dust is efficiently discharged, the feed speed of the drill can be increased, and the boring time with the drill can be decreased. However, since the two-edge drill has the relatively small number of cutting edges, wear of the cutting edges may progress relatively quickly.

FIG. 7 is a cross-sectional view of a typical four-edge drill. The four-edge drill has a larger number of cutting edges than the two-edge drill. Accordingly, as shown in FIG. 7, grooves at the front of the cutting edges in the rotation direction cannot be set large and the discharging efficiency for machining dust may be degraded. Thus, it may be difficult to increase the feed speed of the drill and to decrease the boring time with the drill. On the other hand, since the four-edge drill has a relatively large number of cutting edges, wear of the cutting edges progresses relatively slowly, and holes can be finished with high quality for a long term.

SUMMARY OF THE INVENTION

In light of the situations, the present invention provides a drill partly having four cutting edges, the drill being capable of improving the quality of holes to be machined and extending the service life of the drill as compared with a two-edge drill, by effectively introducing the four cutting edges without any trouble while attaining high cutting performance like the two-edge drill.

A drill according to an aspect of the present invention includes a pair of main cutting edges formed at opposite positions with respect to the axis of the drill; and a pair of auxiliary cutting edges formed at opposite positions with respect to the axis of the drill, the positions of the auxiliary cutting edges being different from the positions of the main cutting edges in a circumferential direction. An axial formation range of each main cutting edge extends from a position close to a proximal end of the drill across a maximum diameter position toward a distal end of the drill. An axial formation range of each auxiliary cutting edge extends from a position close to the proximal end of the drill across the maximum diameter position toward the distal end of the drill. A terminal of the axial formation range of the auxiliary cutting edge located close to the distal end of the drill is closer to the proximal end of the drill than a terminal of the axial formation range of the main cutting edge located close to the distal end of the drill. The auxiliary cutting edge has a ridgeline located within an angle range smaller than 90° from a ridgeline of the main cutting edge toward the rear in a rotation direction of the drill. The ridgelines of the main and auxiliary cutting edges have a point angle of 0° in a range from the maximum diameter position to a position located closer to the proximal end of the drill than the maximum diameter position, and the ridgelines of the main and auxiliary cutting edges have point angles which increase from the maximum diameter position toward the distal end of the drill, the point angle of the auxiliary cutting edges having a higher increasing rate than an increasing rate of the point angle of the main cutting edges in a predetermined range from the maximum diameter position, so that the ridgeline of the auxiliary cutting edge is located closer to the center of the drill than the ridgeline of the main cutting edge and the point angle of the auxiliary cutting edges is larger than the point angle of the main cutting edges in a range from the maximum diameter position toward the distal end of the drill.

Preferably in the aforementioned configuration, the ridgeline of the main cutting edge in an axial range from the maximum diameter position to at least the terminal of the auxiliary cutting edge located close to the distal end of the drill may have a shape of a first arc, the first arc having an end point at the maximum diameter position, a tangent to the first arc at the maximum diameter position being parallel to the axis of the drill. The ridgeline of the auxiliary cutting edge in the axial range from the maximum diameter position to the terminal of the auxiliary cutting edge located close to the distal end of the drill may have a shape of a second arc, the second arc having an end point at the maximum diameter position, a tangent to the second arc at the maximum diameter position being parallel to the axis of the drill. The second arc may have a smaller radius than the first arc.

With the aspect of the present invention, the main cutting edges performs cutting first, the cutting range of the auxiliary cutting edges for a hole to be machined is widened as wear of the main cutting edges progresses, and the main cutting edges also effectively perform cutting in the cutting range of the auxiliary cutting edges. Thus, cutting with the four cutting edges including the main cutting edges and the auxiliary cutting edges can be attained. The maximum diameter position is retracted as the wear progresses. The cutting range of the four cutting edges including the main cutting edges and the auxiliary cutting edges is widened from the initial maximum diameter position toward the distal and proximal ends of the drill as the wear progresses.

Thus, for boring with the drill according to the aspect of the present invention, the drill performs cutting with the two-edge configuration of the main cutting edges first, so that the main cutting edges provide rough machining by handling the major part of cutting a material to be bored. Then, the four cutting edges in the proximal section including the main cutting edges and the auxiliary cutting edges perform finishing.

In addition, since the four cutting edges are introduced at the maximum diameter position as the wear progresses, the further progress of the wear which causes the maximum diameter position to be further retracted can be restricted as compared with the two-edge drill. The service life can be increased. Further, the feed speed required to compensate the retraction of the maximum diameter position can be prevented from increasing.

Accordingly, with the aspect of the invention, the high cutting performance like the two-edge drill can be attained by the main cutting edges in the cutting range of only the main cutting edges. Cutting with the four cutting edges including the main cutting edges and the auxiliary cutting edges can be smoothly introduced without any trouble as the wear progresses. Then, finishing with the four cutting edges can be performed. Thus, the finishing quality of holes to be machined can be improved and the service life of the drill can be extended as compared with the two-edge drill while attaining the high cutting performance like the two-edge drill.

Thus, with the drill according to the aspect of the present invention, a hole with the high finishing quality can be machined in a short time, and a larger number of holes can be repeatedly machined.

DESCRIPTION OF THE PREFERRED EMBODIMENT

Hereinafter, an embodiment of the present invention will be described with reference to the attached drawings. The embodiment is merely an example of the present invention, and hence the present invention should not be limited to the embodiment.

Figure 1:
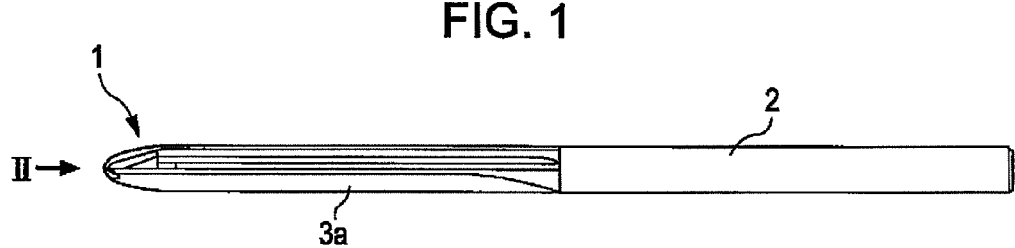
FIG. 1 is an outline side view showing a drill according to an embodiment of the present invention.

Referring to FIG. 1, a drill of this embodiment includes a cutter edge section 1 and a shank section 2. Two straight V-grooves 3a are formed between the cutter edge section 1 and the shank section 2.

Figure 2:
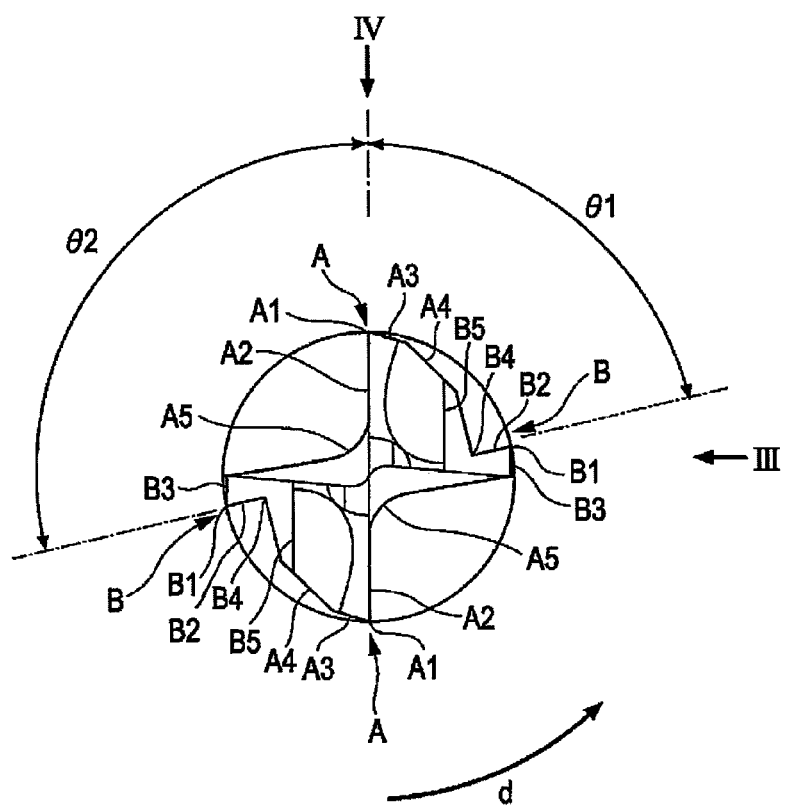
FIG. 2 is a front view showing the drill when seen in a direction indicated by arrow II in FIG. 1.

Referring to FIG. 2, the cutter edge section 1 includes a pair of main cutting edges A symmetrically provided with respect to the axis of the drill, and a pair of auxiliary cutting edges B symmetrically provided with respect to the axis of the drill.

Referring to FIG. 2, arrow d indicates the rotation direction of the drill during cutting. The main cutting edges A each have a rake face A2 and a second relief face A3 that are adjacent to one another at a ridgeline A1. A third relief face A4 is formed continuously from the second relief face A3 at the rear of the second relief face A3 in the rotation direction.

Figure 3:
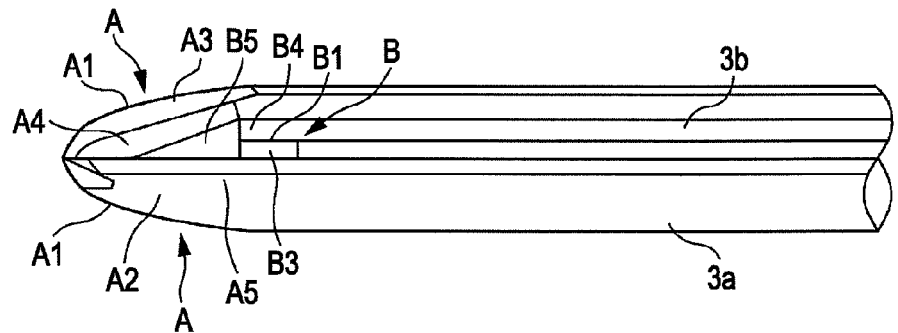
FIG. 3 is an enlarged side view showing the drill when seen in a direction indicated by arrow III in FIG. 2.

A groove A5 is formed at the front of the ridgeline A1 in the rotation direction. The rake face A2 serves as a side wall surface of the groove A5. Referring to FIG. 3, the groove A5 continues with the straight V-groove 3a in the axial direction of the drill.

Referring to FIG. 2, the groove A5 is largely formed in a range of approximately 90° from the ridgeline A1 toward the front in the rotation direction.

The auxiliary cutting edges B each have a rake face B2 and a relief face B3 that are adjacent to one another at a ridgeline B1. The groove A5 is continuously formed at the rear of the relief face B3 in the rotation direction. A groove B4 is formed at the front of the ridgeline B1 in the rotation direction. The rake face B2 serves as a side wall surface of the groove B4. Referring to FIG. 3, the groove B4 continues with a straight V-groove 3b in the axial direction of the drill.

Referring to FIG. 2, the ridgeline B1 of the auxiliary cutting edge B is located within an angle range smaller than 90° from the ridgeline A1 of the main cutting edge A toward the rear in the rotation direction of the drill. That is, illustrated angles θ1 and θ2 satisfy the conditions θ1<90° and θ2>90°.

The main cutting edges A are formed at opposite positions with respect to the axis of the drill. That is, the relative angle of the ridgeline A1 of the one main cutting edge A to the ridgeline A1 of the other main cutting edge A is 180°. Also, the auxiliary cutting edges B are formed at the opposite positions with respect to the axis of the drill. That is, the relative angle of the ridgeline B1 of the one auxiliary cutting edge B to the ridgeline B1 of the other auxiliary cutting edge B is 180°.

Figure 4:
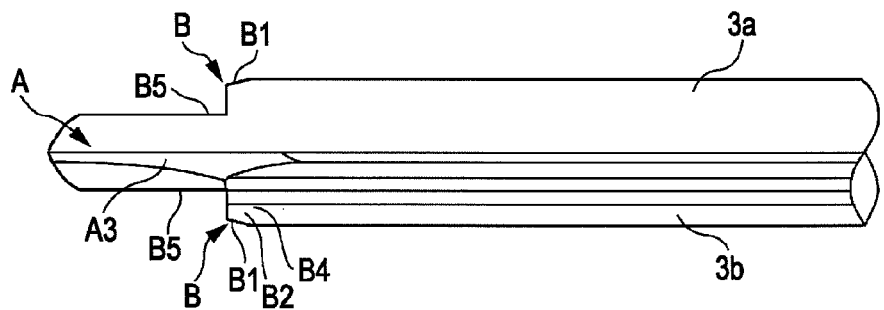
FIG. 4 is an enlarged side view showing the drill when seen in a direction indicated by arrow IV in FIG. 2.

Referring to FIGS. 2 to 4, a groove B5 is formed at the front of each auxiliary cutting edge B in the axial direction of the drill. The groove B5 is formed by cutting and removing a part defined by a plane that continues with the distal ends of the groove B4 and the relief face B3 and is perpendicular to the axis of the drill, and a plane that is parallel to the rake face A2 with a gap interposed therebetween.

Next, axial formation ranges and ridgeline shapes of the cutting edges of the drill according to this embodiment will be described.

Figure 5:
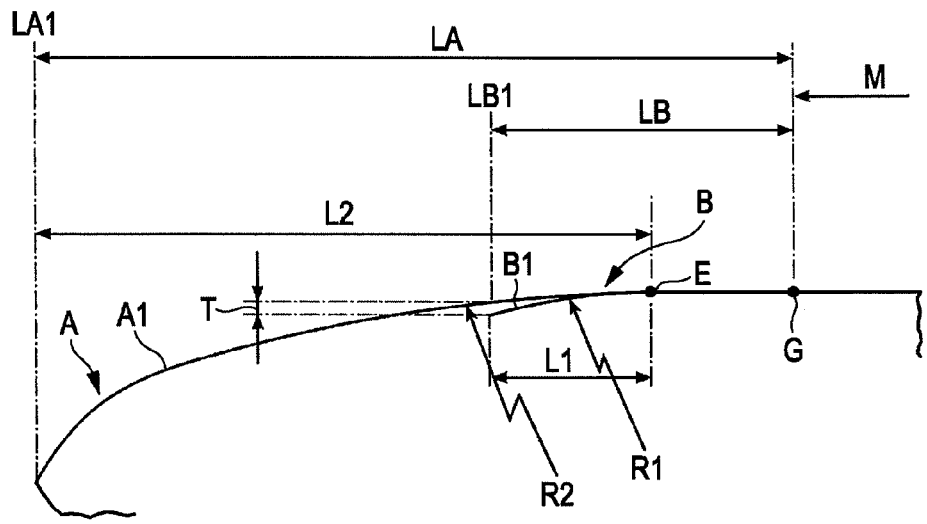
FIG. 5 schematically illustrates ridgeline curves of a main cutting edge and an auxiliary cutting edge of the drill according to the embodiment of the present invention.

FIG. 5 illustrates the initial shape of the drill before use. Referring to FIG. 5, the main cutting edge A is formed in an axial formation range LA from a distal portion of the drill to a position located closer to the proximal end of the drill than a maximum diameter position E. Herein, the chisel edge may remain in the distal portion of the drill. In this case, the main cutting edge A is formed in a range to the chisel edge from the position located close to the proximal end of the drill.

Referring to FIG. 5, the auxiliary cutting edge B is formed in an axial formation range LB from a position located close to the proximal end of the drill across the maximum diameter position E toward the distal end of the drill in a similar manner to the main cutting edge A. However, a terminal LB1 of the axial formation range LB of the auxiliary cutting edge B located close to the distal end of the drill is located closer to the proximal end of the drill than a terminal LA1 of the axial formation range LA of the main cutting edge A located close to the distal end of the drill.

A terminal of the axial formation range LA of the main cutting edge A located close to the proximal end of the drill is aligned with a terminal of the axial formation range LB of the auxiliary cutting edge B located close to the proximal end of the drill. A point G in FIG. 5 represents the aligned point. A range from the point G toward the proximal end of the drill is a margin formation range M. Margins are formed in the range M so as to respectively continue with the main cutting edges A and the auxiliary cutting edges B at the point G.

Referring to FIG. 5, in a range from the maximum diameter position E to the point G located closer to the proximal end of the drill than the maximum diameter position E, the ridgelines A1 and B1 of the main and auxiliary cutting edges A and B are formed at equivalent radial positions and have a point angle of 0°.

The ridgelines A1 and B1 of the main and auxiliary cutting edges A and B have point angles that monotonically increase in a continuously changing manner from the maximum diameter position E toward the distal end of the drill. Herein, the "monotonic increase" includes a straight part, i.e., a part with a constant point angle, but excludes a part with a decreasing point angle. Also, the "continuously changing manner" is effective because a corner part having discontinuously changing point angles is not provided.

The point angle of the main cutting edges A relatively gradually increases from the maximum diameter position E toward the distal end of the drill (in a range L2).

In contrast, the increasing rate of the point angle of the auxiliary cutting edges B from the maximum diameter position E toward the distal end of the drill is higher than that of the main cutting edges A. Referring to FIG. 5, in a range from the maximum diameter position E toward the distal end of the drill, the ridgeline of the auxiliary cutting edge B is located closer to the center of the drill than the ridgeline of the main cutting edge A, and the point angle of the auxiliary cutting edges B is larger than the point angle of the main cutting edges A.

For example, in the range from the maximum diameter position E toward the distal end of the drill, it is assumed that the condition R1<R2 is satisfied when the ridgeline shape of the auxiliary cutting edge B has an arc shape with a radius R1, and the ridgeline shape of the main cutting edge A has an arc shape with a radius R2. In this case, to be more specific, the ridgeline shape of the main cutting edge A in an axial range from the maximum diameter position E to at least the terminal LB1 of the auxiliary cutting edge B located close to the distal end of the drill is the arc with the radius R2, the arc having an end point at the maximum diameter position E, a tangent to the arc at the maximum diameter position E being parallel to the axis of the drill. Also, the ridgeline shape of the auxiliary cutting edge B in an axial range L1 from the maximum diameter position E to the terminal LB1 of the auxiliary cutting edge B located close to the distal end of the drill is the arc with the radius R1, the arc having an end point at the maximum diameter position E, a tangent to the arc at the maximum diameter position E being parallel to the axis of the drill.

Consequently, a gap T (T>0) is generated between the ridgeline positions of the main cutting edge A and the auxiliary cutting edge B at the terminal LB1.

The rapidly increasing range toward the distal end of the drill, in which the increasing rate of the point angle of the auxiliary cutting edges B is higher than the increasing rate of the point angle of the main cutting edges A, may be the entire axial range L1 from the maximum diameter position E to the terminal LB1. Alternatively, the rapidly increasing range may be a partial range from the maximum diameter position E to a point located closer to the proximal end of the drill than the terminal LB1. Even in this case, the ridgeline B1 of the auxiliary cutting edge B is located closer to the center of the drill than the ridgeline A1 of the main cutting edge A, and the point angle of the auxiliary cutting edges B is larger than that of the main cutting edges A, at any axial position in the entire axial range L1 from the maximum diameter position E to the terminal LB1.

Next, the operation of the drill according to this embodiment will be described.

Figure 6A:
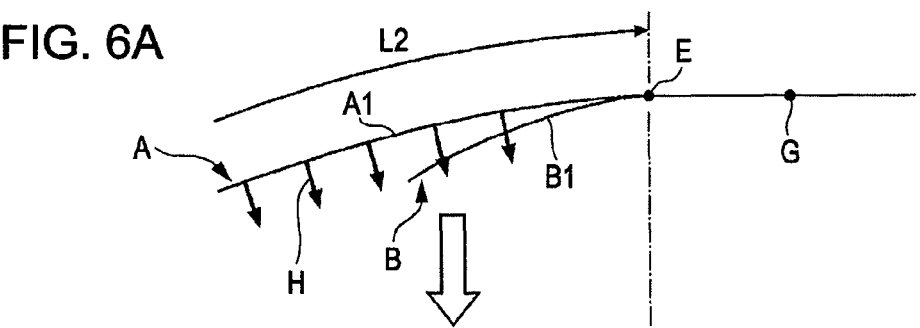
FIG. 6A is a partly enlarged view of FIG. 5.

Referring to FIG. 6A, at the beginning of the use of the drill, the drill cuts a workpiece only with the main cutting edges A. Arrows H indicate the direction in which wear progresses of each main cutting edge A.

Figure 6B:
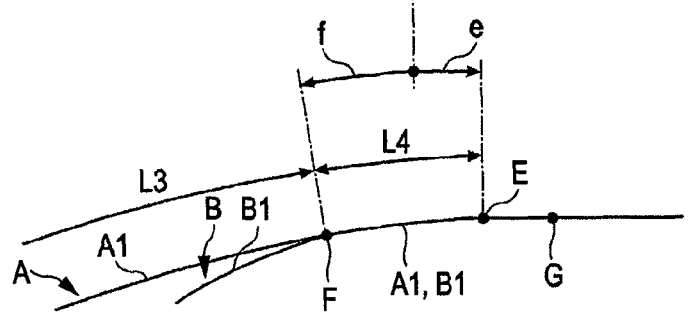
FIG. 6B is a partly enlarged view of the same part as FIG. 6A after wear of that part has progressed.
Figure 7:
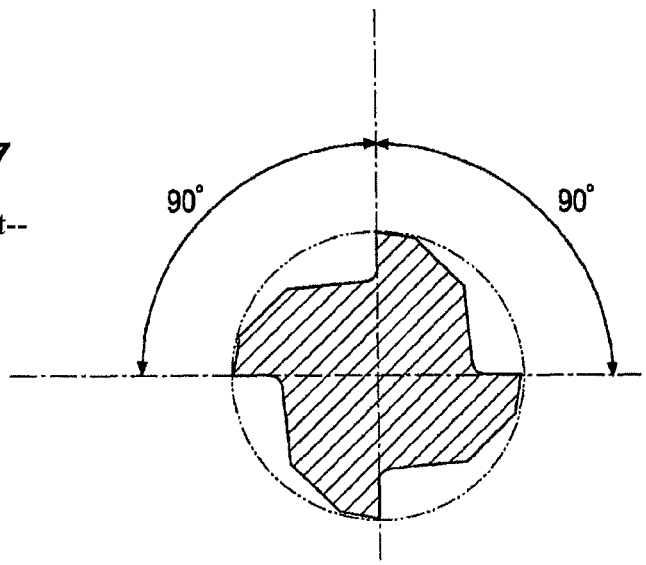
FIG. 7 is a cross-sectional view of a typical four-edge drill.

Referring to FIG. 6B, the maximum diameter position E is retracted toward the proximal end of the drill as the wear of the main cutting edge A progresses. Simultaneously, the ridgeline A1 of the main cutting edge A in the range from the maximum diameter position E toward the distal end of the drill approaches the center of the drill. Cutting with the auxiliary cutting edges B is started. Hence, the cutting range of the auxiliary cutting edges B is widened from the initial maximum diameter position E (FIG. 6A) toward the distal and proximal ends of the drill as indicated by arrows e and f, that is, in a range L4, whereas the range L3 is narrowed and becomes a range L3. The range between the points E and F (the range L4) is the cutting range of the auxiliary cutting edge B, and also the cutting range of the four cutting edges including the main cutting edges A and the auxiliary cutting edges B. As described above with reference to FIG. 2, the conditions θ1<90° and θ2>90° are satisfied. Thus, the main cutting edge A is subjected to a larger cutting load than the auxiliary cutting edge B in the range of the four edges. Owing to this, the main cutting edge A may wear more quickly. The cutting range (the range L4) between the points E and F with the four cutting edges is further widened as the wear progresses.

Thus, for boring with the drill according to this embodiment, the drill performs cutting with the two-edge configuration including the main cutting edges A first, so that the main cutting edges A provide rough machining by handling the major part of cutting a material to be bored. Then, the four cutting edges in the proximal section including the main cutting edges A and the auxiliary cutting edges B perform finishing.

In addition, since the four cutting edges are introduced at the maximum diameter position E as the wear progresses, the further progress of the wear which causes the maximum diameter position E to be further retracted can be restricted as compared with the two-edge drill. The service life can be increased. Further, the feed speed required to compensate the retraction of the maximum diameter position E can be prevented from increasing.

Accordingly, with the drill of this embodiment, the high cutting performance like the two-edge drill can be attained by the main cutting edges A in the cutting range of only the main cutting edges A. Cutting with the four cutting edges including the main cutting edges A and the auxiliary cutting edges B can be smoothly introduced without any trouble as the wear progresses. Then, finishing with the four cutting edges can be effectively performed. Thus, the finishing quality of holes to be machined can be improved and the service life of the drill can be extended as compared with the two-edge drill while attaining the high cutting performance like the two-edge drill.

If the radii of the ridgelines B1 of the auxiliary cutting edges B are aligned with the radii of the ridgelines A1 of the main cutting edges A before use, cutting with the four cutting edges in the formation range of the auxiliary cutting edges B is performed from the start of use. The wear may progress in a markedly different way between in the range of the two edges and the range of the four edges. The main cutting edge may wear in a stepped form at the boundary between the range of the two edges and the range of the four edges. Thus, the drill becomes unuseful in a short term.

In contrast, with the drill of this embodiment, the cutting range of the four cutting edges gradually is widened as the wear progresses. The boundary between the range of the two cutting edges and the range of the four cutting edges is moved. The main cutting edge can be maintained to have a smooth form. The drill can be used until the cutting range of the four cutting edges reaches the point G or the terminal LB1.

With the drill according to this embodiment, the drill has the discharging efficiency for the machining dust equivalent to or higher than that of the two-edge drill, because the grooves A5 and B5 having sizes similar to the grooves of the two-edge drill are provided. The groove A5 having the size similar to the size of the groove of the two-edge drill can be provided as long as the condition θ1<90° is satisfied as a factor.

The angle θ1 of the auxiliary cutting edge to the main cutting edge does not have to satisfy θ1=90° unlike the four-edge drill of related art, but the angle can be selected under the condition $\theta1<90°$. The angle $\theta1$ can be used as a parameter for vibration-preventing design. Thus, a drill which is hardly resonated can be provided.

The terminal LB1 of the auxiliary cutting edge B does not extend to the distal end of the drill because the groove B4 has to be deeper and larger as the terminal LB1 is further widened toward the distal end of the drill. The strength of the cutting edges may be decreased. Thus, the terminal LB1 is located closer to the maximum diameter position E than the distal end of the drill.

In the above-described embodiment, the groove of the drill is the straight groove. However, the groove may be a helical groove. In the above-described embodiment, the points (the maximum diameter positions E), at which the point angles of the main and auxiliary cutting edges A and B become 0°, are arranged on the same point. The present invention is not limited thereto. The main and auxiliary cutting edges A and B may have maximum diameter positions different from one another such that the maximum diameter position of the auxiliary cutting edge B is located closer to the proximal end of the drill than the maximum diameter position of the main cutting edge A.

What is claimed is:

1. A drill, comprising:
a pair of main cutting edges formed at opposite positions with respect to an axis of the drill; and
a pair of auxiliary cutting edges formed at opposite positions with respect to the axis of the drill, the positions of the auxiliary cutting edges being different from the positions of the main cutting edges in a circumferential direction,
wherein an axial formation range of each main cutting edge extends from a position close to a proximal end of the drill across a maximum diameter position toward a distal end of the drill,
wherein an axial formation range of each auxiliary cutting edge extends from a position close to the proximal end of the drill across the maximum diameter position toward the distal end of the drill,
wherein a terminal of the axial formation range of each auxiliary cutting edge located close to the distal end of the drill is closer to the proximal end of the drill than a terminal of the axial formation range of each main cutting edge located close to the distal end of the drill,
wherein each auxiliary cutting edge has a ridgeline located within an angle range smaller than 90° from a ridgeline of a main cutting edge toward the rear in a rotation direction of the drill, and
wherein the ridgelines of the main and auxiliary cutting edges have a point angle of 0° in a range from the maximum diameter position to a position located closer to the proximal end of the drill than the maximum diameter position, and the ridgelines of the main and auxiliary cutting edges have point angles which increase from the maximum diameter position toward the distal end of the drill, the point angle of the auxiliary cutting edges having a higher increasing rate than an increasing rate of the point angle of the main cutting edges in a predetermined range from the maximum diameter position, so that the ridgelines of the auxiliary cutting edges are located closer to the center of the drill than the ridgelines of the main cutting edges and the point angle of the auxiliary cutting edges is larger than the point angle of the main cutting edges in a range from the maximum diameter position toward the distal end of the drill.

2. The drill according to claim 1,
wherein the ridgeline of each main cutting edge in an axial range from the maximum diameter position to at least the terminal of the auxiliary cutting edges located close to the distal end of the drill has a shape of a first arc, the first arc having an end point at the maximum diameter position, a tangent to the first arc at the maximum diameter position being parallel to the axis of the drill,
wherein the ridgeline of each auxiliary cutting edge in the axial range from the maximum diameter position to the terminal of the auxiliary cutting edges located close to the distal end of the drill has a shape of a second arc, the second arc having an end point at the maximum diameter position, a tangent to the second arc at the maximum diameter position being parallel to the axis of the drill, and
wherein the second arc of each auxiliary cutting edge has a smaller radius than the first arc of each main cutting edge.

3. The drill according to claim 1, wherein the maximum diameter position of the main cutting edges and the maximum diameter position of the auxiliary cutting edges are located at substantially the same position in an axial direction of the drill.

4. The drill according to claim 1, wherein straight grooves are formed along an axial direction of the drill between a cutter edge section and a shank section, the cutter edge section including the pair of main cutting edges and the pair of auxiliary cutting edges, and the shank section being located in a rear position with respect to the cutter edge section in the axial direction of the drill.

* * * * *